Figure 1:
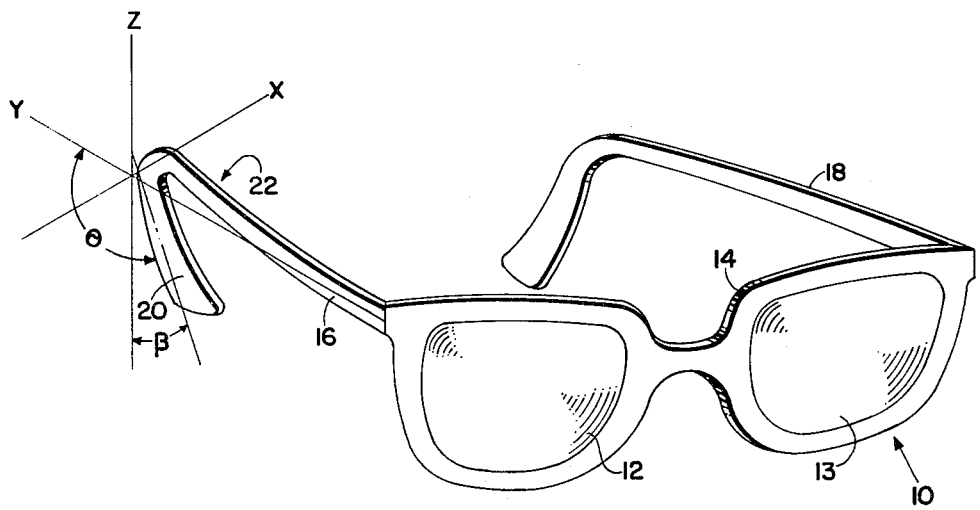

United States Patent

Heijenga

[15] 3,673,844

[45] July 4, 1972

[54] METHOD AND APPARATUS FOR SHAPING TEMPLE PIECES FOR SPECTACLES

[72] Inventor: Berend Heijenga, Norwood, Mass.

[73] Assignee: Polaroid Corporation, Cambridge, Mass.

[22] Filed: Feb. 20, 1970

[21] Appl. No.: 13,112

[52] U.S. Cl. .................................72/298, 72/216, 81/3.5
[51] Int. Cl. ...........................................B21d 11/02
[58] Field of Search ................29/20; 81/3.5; 72/298, 311, 72/149, 216

[56] References Cited

UNITED STATES PATENTS

| | | | |
|---|---|---|---|
| 3,339,390 | 9/1967 | Sommer | 72/133 |
| 2,642,765 | 6/1953 | Mears et al. | 81/3.5 |
| 2,544,067 | 3/1951 | Collinson | 81/3.5 |
| 3,108,504 | 10/1963 | Eichenger | 81/3.5 |
| 2,661,645 | 12/1953 | Heath | 81/3.5 |

*Primary Examiner*—Charles W. Lanham
*Assistant Examiner*—Michael J. Keenan
*Attorney*—Brown and Mikulka, William D. Roberson and Michael Bard

[57] ABSTRACT

The subject invention contemplates a process and apparatus for automatically shaping temple pieces used in spectacles. One end portion of a temple piece is rigidly secured by a fixture, the other end portion being unsecured, and rotates therewith so that the movement of the temple pieces generates a cylinder. A spool is rotatably secured to a spindle whose longitudinal axis is generally transverse to the axis of rotation of the temple piece and the spool is provided with an annular recess adapted to receive one end portion of the temple piece.

At one point in the rotation of the fixture, the unsecured end portion of the temple piece is brought into engagement with the annular recess in the spool. Further rotation of the fixture will cause a portion of the temple piece engaging the spool to bend away from the longitudinal axis of the temple piece as it rolls past the spool.

The end portion of the temple piece rolling past the spool is constrained by the annular recess so that it can only move within a single plane at any instant. At the same time, the plane of that portion of the temple piece engaged by the fixture is caused to rotate, due to the rotation of the fixture, so as to effectively twist the end portion of the temple piece, in engagement with the spool, about the longitudinal axis of such temple piece.

The spool may also be slidably secured to the spindle so as to be movable upwardly thereon. By suitably restraining the upward travel of the spool, the temple piece may be caused to bow a predetermined amount between the fixture and the spool. Thus, it is readily apparent that temple pieces may be suitably shaped in each of three mutually perpendicular planes so as to more closely conform to the head shape of the prospective wearer and provide a more comfortable and proper fit therefor.

23 Claims, 6 Drawing Figures

INVENTOR.
BEREND HEIJENGA

BY Brown and Mikulka
and
Michael Bard
ATTORNEYS

INVENTOR.
BEREND HEIJENGA

BY Brown and Mikulka
and
Michael Bard
ATTORNEYS

INVENTOR.
BEREND HEIJENGA

BY Brown and Mikulka
and
Michael Bard
ATTORNEYS

METHOD AND APPARATUS FOR SHAPING TEMPLE PIECES FOR SPECTACLES

BACKGROUND OF THE INVENTION

The present invention relates generally to frames for spectacles and, more particularly, to an improved method and apparatus for automatically shaping the temple pieces therefor.

In the optical trade, frames for spectacles are generally comprised of a cellulose composition material and the temple pieces may or may not include a central metallic core. It has been found particularly difficult to suitably shape temple pieces constructed of such material to assure a comfortable fit for the wearer of the spectacles and to insure that the lenses will be properly positioned before the eyes.

Irrespective of the composition or structure of the spectacle frames, prior art techniques (for suitably shaping the temple pieces thereof) have generally relied on the manual bending of such temple pieces to the desired shape. The suitably shaped temple piece was then mounted in a jig or fixture designed to cause the temple piece to remain in its bent configuration.

While the temple piece was so held, in the jig or fixture, a suitable temperature treatment was applied to assure seasoning of the temple piece so as to prevent this temple piece from returning to its original shape. Such prior art techniques were inefficient, costly and greatly consuming of time. Yet, such outmoded techniques have continued in use to the present time.

SUMMARY OF THE INVENTION

The present invention provides a method and apparatus for suitably shaping temple pieces for spectacle frames automatically, quickly and efficiently.

The novel method and apparatus envisioned herein is accomplished by means of a turret carrying plural holding fixtures. The turret is free to rotate and each of said fixtures is adapted to receive and rigidly secure one end portion of a temple piece such that each said temple piece extends outwardly of its respective holding fixture, with its longitudinal axis lined in spaced parallel relationship to the axis of rotation of the turret. Rotation of the turret will cause the temple piece to generate a generally cylindrical surface.

A spool having an annular groove, about one end portion thereof, is rotatably and slidably secured to a spindle, which is secured to a base or mounting platform, such that the spool rotates about an axis generally normal to the axis of rotation of the turret.

The spindle and its associated spool are so positioned that when a temple piece is in a generally horizontal position, a predetermined end portion thereof will be in engagement with the annular groove in the spool. The annular groove is adapted to tightly receive the temple piece and prevent its tortional movement therein while allowing said temple piece to roll therealong.

Rotation of the turret will cause the temple piece to roll along said groove such that the end portion of said temple piece is caused to bend away from the longitudinal axis thereof. At the same time, that portion of the temple piece secured by the holding fixture will exhibit a rotation of its transverse axis relative to that portion of said temple piece which is restrained from tortional movement by the annular groove.

While the temple piece is rolling past the spool, twisting, and having its end portion bent away from the longitudinal axis thereof, the spool will be caused to slide vertically upward on the spindle, such that the movement of the spool away from the base will match that of the portion of the temple piece secured by the fixture (due to the rotation of the turret) from the base.

By suitably inhibiting or restraining the upward movement of the spool as by pre-selecting the length of the spool and that of the spindle, the temple piece may be caused to bow between the fixture and the spool. Thus, a temple piece may be suitably shaped in each of three mutually perpendicular planes so as to assure a proper and comfortable fit for the person wearing same.

Accordingly, it is an object of the present invention to provide an improved method and apparatus for automatically shaping temple pieces for spectacles.

Another object of the present invention is to provide a method and apparatus for suitably shaping temple pieces automatically and efficiently to assure a comfortable and proper fit for the wearer.

Still another object of this invention resides in the provision of a method and apparatus for simultaneously bending an initially straight member in at least two mutually orthogonal planes.

Yet another object of this invention is to provide an improved method and apparatus for automatically and efficiently shaping a temple piece in any of three mutually orthogonal planes.

It is a further object of the instant invention to provide an improved method and apparatus for automatically and simultaneously shaping an initially straight temple piece in mutually orthogonal planes.

Figure 2:
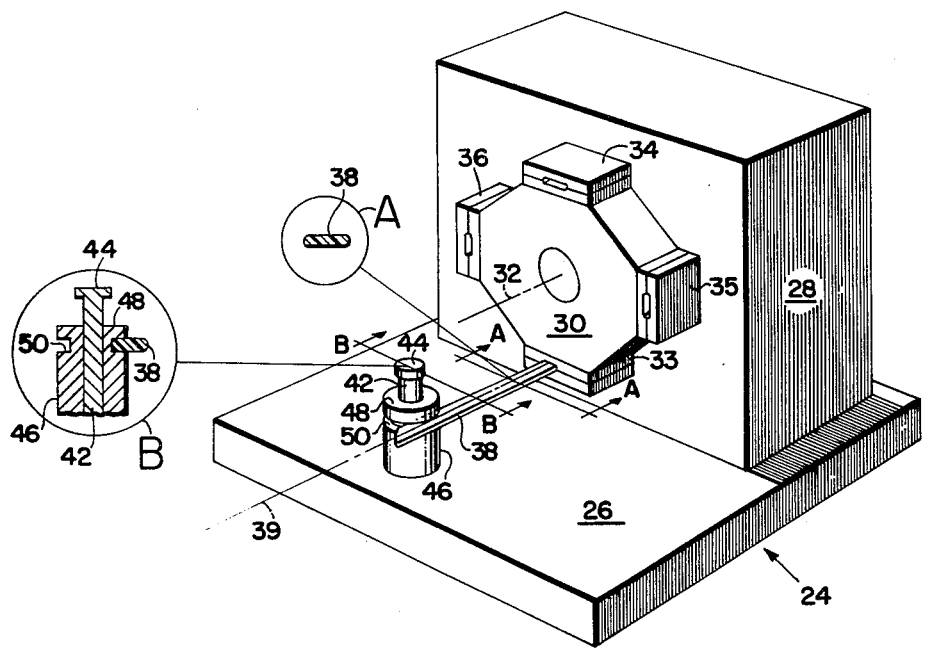
Figure 3:
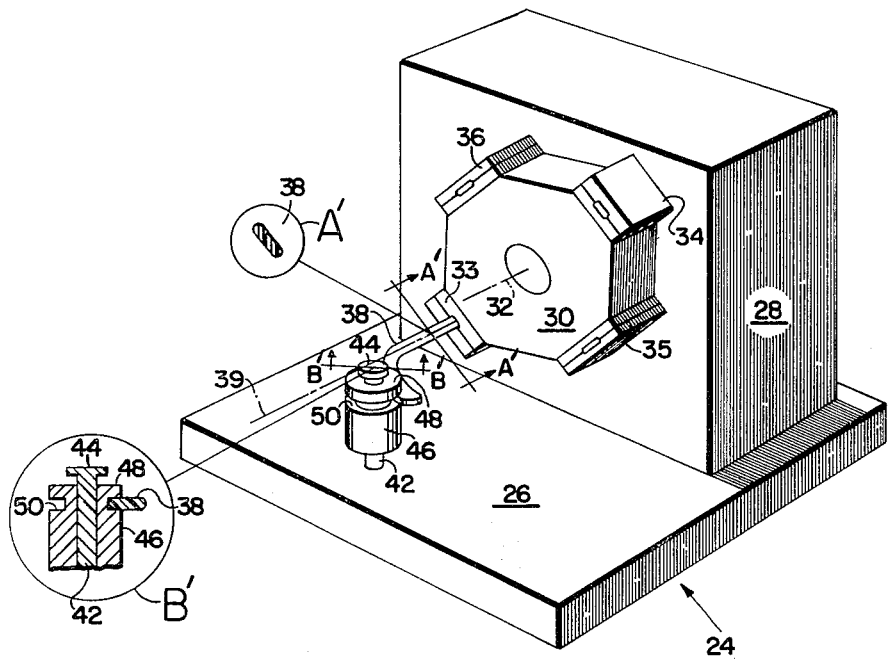
Figure 4:
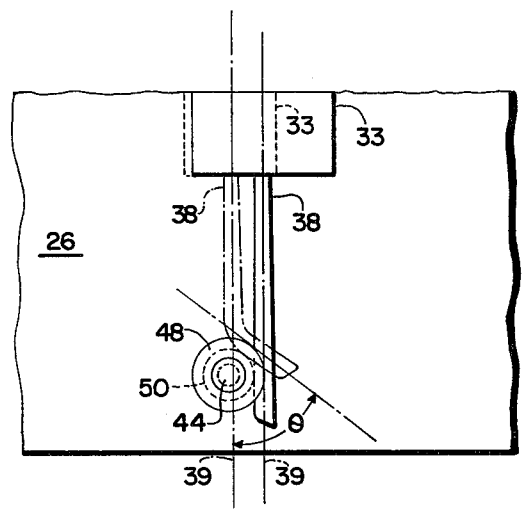
Figure 5:
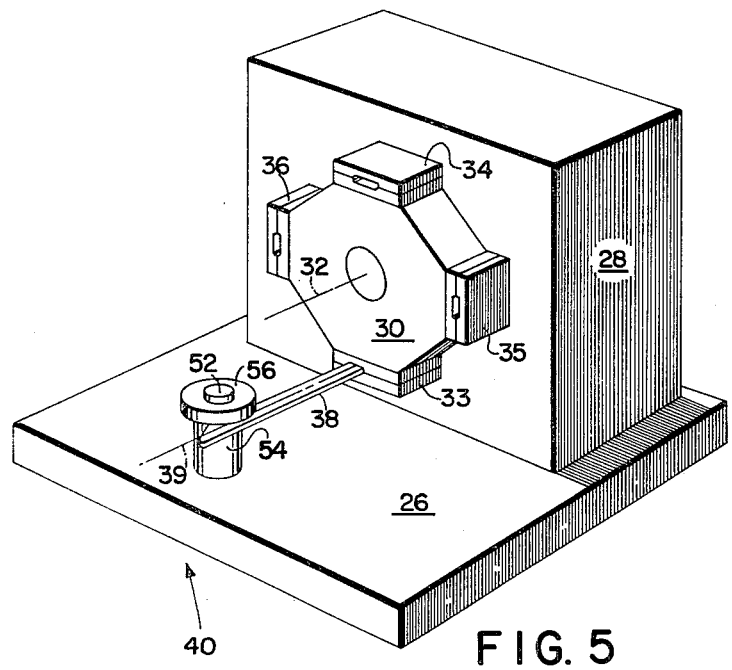
Figure 6:
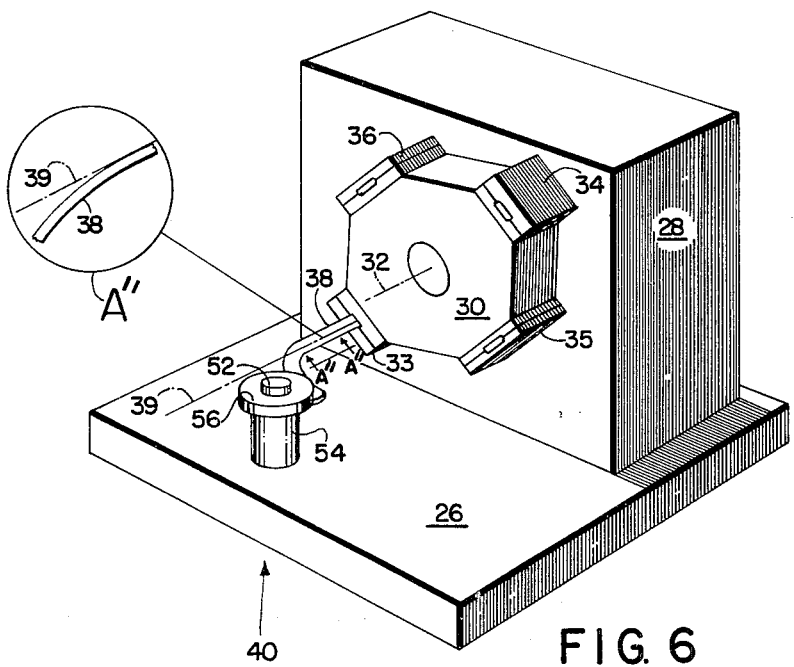

Other objects and many of the attendant advantages of the present invention will be better appreciated and said invention will become clearly understood by reference to the following detailed description when considered in conjunction with the accompanying drawings illustrating two embodiments of the instant invention, wherein:

FIG. 1 provides a perspective of a pair of spectacles having temple pieces suitably shaped in each of three mutually orthogonal planes;

FIG. 2 provides a perspective of one embodiment of the instant invention including enlarged detail sections A and B of portions thereof;

FIG. 3 provides a perspective of the invention illustrated in FIG. 2 with the component parts moved to a different position and with portions thereof shown by enlarged detail sections A' and B', corresponding to sections A and B of FIG. 2, respectively;

FIG. 4 provides a top plan of the embodiment of the instant invention illustrated in FIGS. 2 and 3;

FIG. 5 provides a perspective of a second embodiment of the instant invention; and FIG. 6 provides a perspective of the invention of FIG. 5 with the component parts thereof moved to a new position and includes an enlarged detail of a position of the temple piece.

Referring to the drawings in more detail and more particularly to FIG. 1, a pair of spectacles is shown generally at 10 spatially positioned with respect to three mutually orthogonal axes X, Y and Z. The spectacles 10 are seen to include a pair of lenses 12 and 13 secured within a mounting 14 having right and left temple pieces 16 and 18, respectively, affixed thereto. It should be noted at this point that one temple piece 16 or 18 is the mirror image of the other temple piece 16 or 18 so that a description of one will suffice for the other.

The temple piece 16 is seen to include an end portion 20 and if we consider the Y axis to be coincident with the longitudinal axis of a perfectly straight temple piece (such as the temple piece 16 prior to being shaped), it is seen that the end portion 20 of the temple piece 16 is bent inwardly of said longitudinal axis an angular distance in the Y–Z plane. The end portion 20 of the temple piece 16 is also seen to be rotated or twisted about said longitudinal axis an angular distance $\beta$ from the Z axis in the X–Z plane. Additionally, the temple piece 16 is seen to be bowed, with respect to its longitudinal axis, at 22, in the X–Y plane.

Referring again to FIG. 2, one embodiment of the instant invention is shown in perspective at 24 and is seen to include a generally horizontal base 26 with a support 28 extending vertically upward therefrom and secured thereto in a well-known manner. A turret 30 is rotatably secured to the support 28 in a well-known manner for rotation about a generally horizontal axis 32 and includes a plurality of diametrically positioned holding fixtures 33 and 34, and 35 and 36, respectively, thereon.

Each of the holding fixtures 33 through 36 is identical and each is adapted to receive and rigidly secure one end portion of a temple piece, such as the temple piece 38, which will extend outwardly therefrom (with its longitudinal axis 39 generally parallel to the axis of rotation 32 of the turret 30). Typically, plural work stations (not shown) may be provided such that various operations such as drilling, cutting, shaping, etc., may be performed with respect to each said temple piece 38 secured by the holding fixtures 33 through 36, respectively.

For the purposes of the invention herein described, only one such work station is illustrated; i.e., the station 40, utilized for shaping the temple piece 38, and for purposes of clarity only the holding fixture 33 is shown rigidly securing a temple piece 38. The shaping work station 40 (of which there may be more than one, particularly where the only operation desired to be performed upon the temple pieces is their shaping) is seen to include a spindle 42 rigidly secured to the base 26 and extending vertically upward therefrom to a head 44.

A spool 46 is rotatably mounted on the spindle 42 for rotation about the longitudinal axis thereof and said spool 46 is free to slide vertically on said spindle 42 until its upper surface 48 engages the head 44. The spool 46 includes an annular recess 50, about the periphery of the upper end portion thereof, which is adapted to receive one end portion of the temple piece 38 so as to permit it to roll therealong while restricting the movement thereof to prevent rotation about the longitudinal axis 39.

The spindle 42 and its associated spool 46 are suitably positioned on the base 26 such that when the temple piece 38 is in a generally horizontal plane, at its closest approach to said base 26, one end portion of said temple piece 38 will just be engaged by the annular recess 50 in the spool 46. As best seen in enlarged detail sections A and B, taken along lines A—A and B—B, respectively, when the temple piece 38 just comes into engagement with the annular recess 50 the cross-section of that portion of said temple piece 38 in engagement with said annular recess 50 is generally parallel to the cross-section of that portion of the temple piece 38 near the holding fixture 33.

Referring again to FIG. 3 and 4, the embodiment of the invention illustrated in FIG. 2 is shown with the turret 30 rotated clockwise approximately 45° (as by means of a motor not shown).

As best seen in FIG. 3 and 4, clockwise rotation of the turret 30 causes the holding fixture 33 and the temple piece 38 to transversely traverse the base 26. However, the end portion of the temple piece 38 in engagement with the annular recess 50, of the spool 46, is restrained thereby and is caused to be bent back an angular distance $\theta$ from the longitudinal axis 39, in a plane perpendicular to the longitudinal axis of the spindle 42.

At the same time, the clockwise rotation of the turret 30 will cause the temple piece 38 to move vertically upward from the base 26 and carry the spool 46 therewith until the end portion of the temple piece 38 has completely rolled along the annular recess 50 and become disengaged therefrom. By making the spindle 42 long enough, the spool 46 will be able to rise vertically with the temple piece 38 until the temple piece 38 has completely passed the spool 46. At this point, the spool 46 will fall to its initial position and await the receipt of another temple piece 38. The head 44 merely serves to prevent any upward momentum of the spool 46 from causing it to rise off the spindle 42.

As best seen in the enlarged detail sections A' and B', taken along lines A'—A' and B'—B', respectively, of FIG. 3, clockwise rotation of the turret 30 will effect a clockwise rotation of the cross-section of the portion of the temple piece 38 near the holding fixture 33. At the same time the end portion of the temple piece 38 received within the annular recess 50 will be restrained from rotating and will remain essentially horizontal.

Thus, the end portion of the temple piece 38, which is bent back from the longitudinal axis 39 an angular distance $\theta$, will additionally be caused to simultaneously rotate about said axis 39, with respect to that portion of said temple piece 38 secured by the holding fixture 33. This rotation about the longitudinal axis 39 corresponds to the angular displacement $\beta$ of the end portion 20 of the temple piece 16 illustrated in FIG. 1.

The degree to which such a twist takes place will depend upon the point, during the rotational cycle of the turret 30, that the temple piece 38 disengages from the annular recess 50 in the spool 46. This point of disengagement in turn depends upon such factors as the radial distance from the temple piece to the axis of rotation of the turret 30, the length of the temple piece 38, and the position of the spindle 42 and the spool 46 relative to the turret 30.

Referring again to FIG. 5, a third embodiment of the instant invention is shown wherein the spool 46 of FIGS. 3 and 4 is replaced with a lug 54 having a cap 56; said lug 54 and said cap 56 being secured normally to the base 26 by the pin 52. With the exception of the lug 54, its cap 56, and its securing pin 52, all other components of this embodiment remain unchanged and have been identified with the same numerals used in FIGS. 2, 3 and 4. In the embodiment of FIG. 5, the temple piece 38 initially engages the lug 54 a predetermined distance below the cap 56, when the position of the turret 30 is such that said temple piece 38 essentially lies in a plane parallel to the base 26 and is at its point of closest approach thereto.

As best seen in FIG. 8, rotation of the turret 30 will cause the temple piece 38 to simultaneously slide transversely and longitudinally on the lug 54 until the temple piece 38 engages the cap 56, which will prevent further longitudinal sliding on said lug 54. At this point, further rotation of the turret 30 will cause the temple piece 38 to bow as best illustrated in enlarged detail A" of FIG. 6. Such bowing occurs because one end portion of the temple piece 38 is being carried upward by the holding fixture 33 while upward movement of the end portion of said temple piece 38 engaging the lug 54 is restrained by the cap 56.

As in the embodiments previously described herein, the end portion of the temple piece 38 engaging the lug 54 will be bent back from the longitudinal axis 39 as it slides transversely past the lug 54. Simultaneously, said temple piece 38 will bow away from the longitudinal axis 39 until such time as said temple piece 38 has moved clear of lug 54.

It should be noted that in the embodiments of FIGS. 2, 3 and 4, the end portion of the temple piece 38 in engagement with the spool 46 is restrained from rotating by the annular recess 50. However, in the embodiment of FIGS. 5 and 6, no restraint is provided against rotation of the end portion of the temple piece 38 in engagement with the lug 54. Thus, in the embodiment of FIGS. 5 and 6, the temple piece 38 will not be given an angular displacement $\theta$ about its longitudinal axis, but will be bowed as illustrated in FIG. 1, hereinabove.

In each of the embodiments of the invention illustrated supra, the shaping of a left temple piece 38 was illustrated. However, as pointed out herein, left and right temple pieces for spectacles are mirror-images of one another. Accordingly, it is apparent that, by utilizing the novel apparatus illustrated herein, right temple pieces may be shaped by rearranging the novel apparatus in the mirror image of that illustrated.

It can readily be seen that many variations and modifications of the present invention are possible in the light of the aforementioned teachings and it will be apparent to those skilled in the art that various changes in form and arrangement of components may be made to suit requirements without departing from the spirit and scope of the invention. It is therefore to be understood that within the scope of the appended claims the instant invention may be practiced in a manner otherwise than is specifically described herein.

What is claimed is:

1. A method for shaping temple pieces for spectacles, including the steps of:

rotating a temple piece about an axis remote from its longitudinal axis;

restraining one end portion of said temple piece from rotation about said longitudinal axis whereby said temple piece is permanently deformed about its longitudinal axis; and restraining said end portion from translation in at least one direction.

2. The method of claim 1, wherein said restraints are applied simultaneously and during a predetermined portion of said rotation about said remote axis.

3. The method as recited in claim 2, wherein said remote axis is parallel to said longitudinal axis.

4. The method of shaping temple pieces for spectacles encompassing the steps of:

rotating a temple piece about an axis other than its longitudinal axis;

restraining one end portion of said temple piece against translation in one direction; and restraining said end portion against translation in another direction whereby said temple piece is permanently deformed in both said directions.

5. The method of claim 4, wherein at least a portion of both said restraints occur simultaneously.

6. The invention as set forth in claim 5, wherein one of said restraints is normal to the other.

7. Apparatus for shaping temple pieces for spectacles, including:

means for rotating a temple piece about an axis remote from its longitudinal axis;

means for restraining translation of a predetermined portion of said temple piece in one plane; and means for restraining a predetermined portion of said temple piece from rotation about said longitudinal axis whereby said temple piece is permanently deformed about its longitudinal axis.

8. The invention of claim 7, wherein said translation restraining means is adapted to permit translation of said temple piece in a plane normal to said first mentioned plane.

9. The invention recited in claim 8, wherein said rotating means includes a rotatable turret having a plurality of holding fixtures, each capable of rigidly securing a temple piece.

10. The invention as set forth in claim 9, wherein each temple piece is received within a holding fixture so as to extend outwardly therefrom with its longitudinal axis parallel to the axis of rotation of said turret.

11. The invention as related in claim 10, wherein said restraining means include means adapted to permit the temple piece restrained thereby to roll thereacross whilst simultaneously deforming said temple piece in mutually orthogonal planes.

12. The invention as stated in claim 11, wherein said restraining means comprises a generally cylindrical spool rotatably mounted on a spindle and capable of sliding longitudinally thereon in response to rotation of said temple piece about said remote axis.

13. The invention as related in claim 12, wherein said spool is provided with an annular recess about the periphery of one end portion thereof, adapted to receive a portion of said temple piece and prevent the rotation of the portion of said temple piece so received.

14. The invention as set forth in claim 13, additionally including a base and a support secured normally to said base, said turret being secured to said support for rotation about an axis parallel to said base and said spindle being secured normal to said base with its longitudinal axis in spaced relation to said axis of rotation of said turret.

15. The invention as described in claim 14, additionally including means for limiting the longitudinal travel of said spool outwardly of said base.

16. A mechanism for shaping temple pieces for spectacles, including:

means for simultaneously moving a temple piece in each of three mutually orthogonal planes; and means for receiving a portion of said temple piece and simultaneously restraining movement thereof in at least two of said planes an amount sufficient to permanently shape said temple piece in each of said planes of restraint.

17. The invention of claim 16, wherein said means for simultaneously moving said temple piece in each of three mutually orthogonal planes includes means for rotating said temple piece about an axis remote from its longitudinal axis.

18. The invention as described in claim 17, wherein said receiving means comprises a generally cylindrical lug, having a cap, so positioned that said temple piece initially engages said lug a predetermined distance below said cap, whereby rotation of said temple piece moving means will cause said temple piece to slide transversely and longitudinally on the periphery of said lug until said cap engages said temple piece to restrain further longitudinal sliding thereof on said lug periphery.

19. The invention of claim 18, wherein said lug is adapted to permit said temple piece to simultaneously slide longitudinally and roll transversely along its periphery.

20. The invention as described in claim 19, wherein said rotating means includes a turret having a plurality of holding fixtures, each capable of rigidly securing a temple piece.

21. The invention as related in claim 20, wherein each temple piece is received within a holding fixture so as to extend outwardly therefrom with its longitudinal axis parallel to the axis of rotation of said turret.

22. The invention as set out in claim 21, additionally including a base and a support secured normally to said base, said turret being secured to said support for rotation about an axis parallel to said base and said lug being secured normal to said base with its longitudinal axis in spaced relation to said axis of rotation of said turret.

23. Apparatus for shaping temple pieces for spectacles, including:

means for rigidly securing one end portion of an elongated temple piece and rotating said temple piece about an axis other than its longitudinal axis such that said secured end portion rotates about said longitudinal axis;

means for receiving the other end portion of said temple piece remote from said one end portion and restraining same from rotation about said longitudinal axis; and means movable with said other end portion in one direction for restraining the movement of said other end portion in a direction normal to said one direction, whereby said other end portion will be simultaneously rotated about said longitudinal axis with respect to said one end portion and displaced from said longitudinal axis in said normal direction an amount sufficient to impart a permanent set thereto both in said normal direction and about said longitudinal axis.

* * * * *